United States Patent [19]

Howell et al.

[11] Patent Number: 5,357,631
[45] Date of Patent: Oct. 18, 1994

[54] METHOD AND SYSTEM FOR CREATING AND MAINTAINING MULTIPLE DOCUMENT VERSIONS IN A DATA PROCESSING SYSTEM LIBRARY

[75] Inventors: William E. Howell, North Richland Hills; Hari N. Reddy, Grapevine; Diana S. Wang, Trophy Club, all of Tex.

[73] Assignee: International Business Machines Corporation, Armonk, N.Y.

[21] Appl. No.: 805,447

[22] Filed: Dec. 9, 1991

[51] Int. Cl.$^5$ ................ G06F 15/40; G06F 15/20
[52] U.S. Cl. .................... 395/600; 395/700; 364/DIG. 2; 364/962; 364/962.1; 364/962.4
[58] Field of Search ............... 364/962.3, 962.2, 962.1, 364/960

[56] References Cited

U.S. PATENT DOCUMENTS

| | | | |
|---|---|---|---|
| 4,558,413 | 12/1985 | Schmidt et al. | 364/300 |
| 4,714,996 | 12/1987 | Gladney et al. | 364/300 |
| 4,875,159 | 10/1989 | Cary et al. | 364/200 |
| 4,912,637 | 3/1990 | Sheedy et al. | 364/300 |
| 5,101,345 | 3/1992 | MacPhail | 395/600 |
| 5,179,718 | 1/1993 | MacPhail | 395/800 |

FOREIGN PATENT DOCUMENTS

| | | | |
|---|---|---|---|
| 0230616A2 | 8/1987 | European Pat. Off. | G06F 15/40 |
| 0371606A2 | 6/1990 | European Pat. Off. | G06F 15/21 |

OTHER PUBLICATIONS

Patent Abstracts Of Japan vol. 15 No. 79, Dec. 1990, Tanifuji Shinya "Document Processing System And Version Control System".

Primary Examiner—Gareth D. Shaw
Assistant Examiner—Jon H. Backenstose
Attorney, Agent, or Firm—David A. Mims; Andrew J. Dillon

[57] ABSTRACT

A method and system for creating and maintaining multiple document versions in a data processing system implemented library. Selected documents within a data processing system implemented library are uniquely identified as root documents and a version-root identifier for each successor version of a particular root document is established. Thereafter, a selected version-root identifier is automatically associated with each created successor version of a root document. Upon the creation of a successor version of a root document and a second predecessor document, the version-root identifier associated with the root document is automatically associated with the successor version and the second predecessor document. Upon the creation of a successor version base upon multiple non-root predecessor documents a particular non-root predecessor document is automatically selected as a root document and a version-root identifier is established and associated therewith. Thereafter, the newly established version-root identifier is automatically associated with all non-root predecessor documents and the successor version based thereon.

9 Claims, 4 Drawing Sheets

METHOD AND SYSTEM FOR CREATING AND MAINTAINING MULTIPLE DOCUMENT VERSIONS IN A DATA PROCESSING SYSTEM LIBRARY

BACKGROUND OF THE INVENTION

1. Field of the Invention

The present invention relates in general to data processing system implemented libraries and in particular to a method and system for creating and maintaining multiple document versions within a data processing system implemented library. Still more particularly the present invention relates a method and system for creating and maintaining multiple predecessor and successor versions of a document within a data processing system implemented library.

2. Description of the Prior Art

Electronically implemented "libraries" are rapidly surpassing more traditional forms of information storage in the world today. It is quite common for data processing system implemented libraries to maintain and control thousands of different objects, or documents. The rules by which such documents may be altered and/or maintained are typically governed by various standards such as the International Standard ISO/IEC 10166, Document Filing and Retrieval (DFR).

One problem which exists in such electronic libraries is the management and control of multiple versions of a selected document in a so-called "Conceptual Document" wherein all documents therein are related. Many systems exist for governing relationships between multiple versions of a single document in a linear relationship. That is, a relationship wherein a selected document may have single predecessor document and a single successor document. While the need for a method and system which permits each document to have multiple predecessors and successor documents has been generally alluded to, no current library system permits such a relationship to be created and maintained.

It should therefore be apparent that a need exist for a method and system which permits multiple predecessor and successor versions of a document to be created and maintained within a data processing system library.

SUMMARY OF THE INVENTION

It is therefore one object of the present invention to provide an Improved data processing system implemented library.

It is another object of the present invention to provide an improved method and system for creating and maintaining multiple document versions within a data processing system implemented library.

It is yet another object of the present invention to provide an improved method and system for creating and maintaining multiple predecessor and successor versions of a document within a data processing system implemented library.

The foregoing objects are achieved as is now described. Selected documents within a data processing system implemented library are uniquely identified as root documents and a version-root identifier for each successor version of a particular root document is established. Thereafter, a selected version-root identifier is automatically associated with each created successor version of a root document. Upon the creation of a successor version of a root document and a second predecessor document, the version-root identifier associated with the root document is automatically associated with the successor version and the second predecessor document. Upon the creation of a successor version based upon multiple non-root predecessor documents a particular non-root predecessor document is automatically selected as a root document and a version-root identifier is established and associated therewith. Thereafter, the newly established version-root identifier is automatically associated with all non-root predecessor documents and the successor version based thereon.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
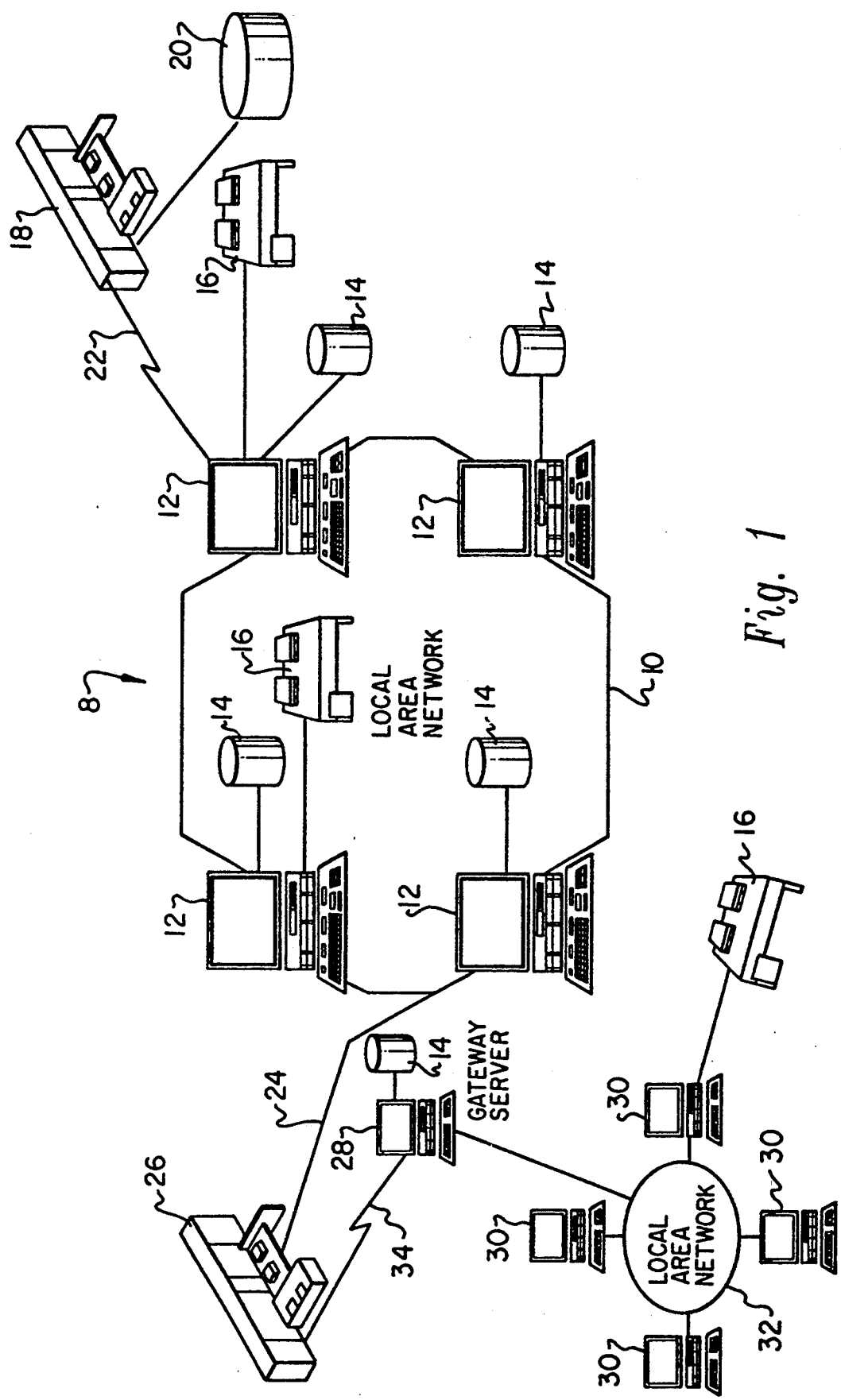
FIG. 1 is a pictorial representation of a distributed data processing system which may be utilized to implement the method and system of the present invention.
Figure 2A:
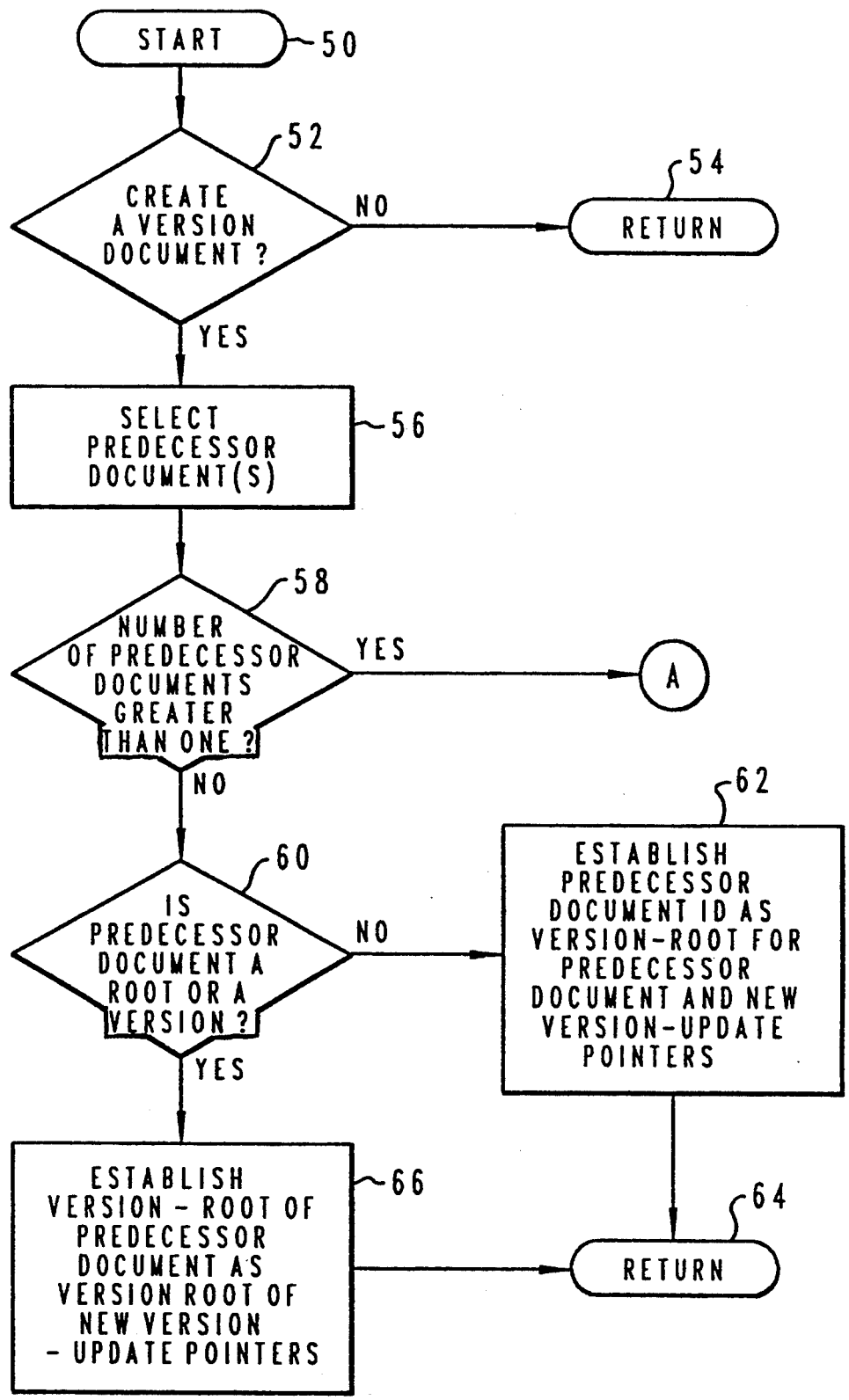
FIGS. 2A and 2B are high level logic flow charts illustrating a software implementation of the method and system of the present invention.
Figure 2B:
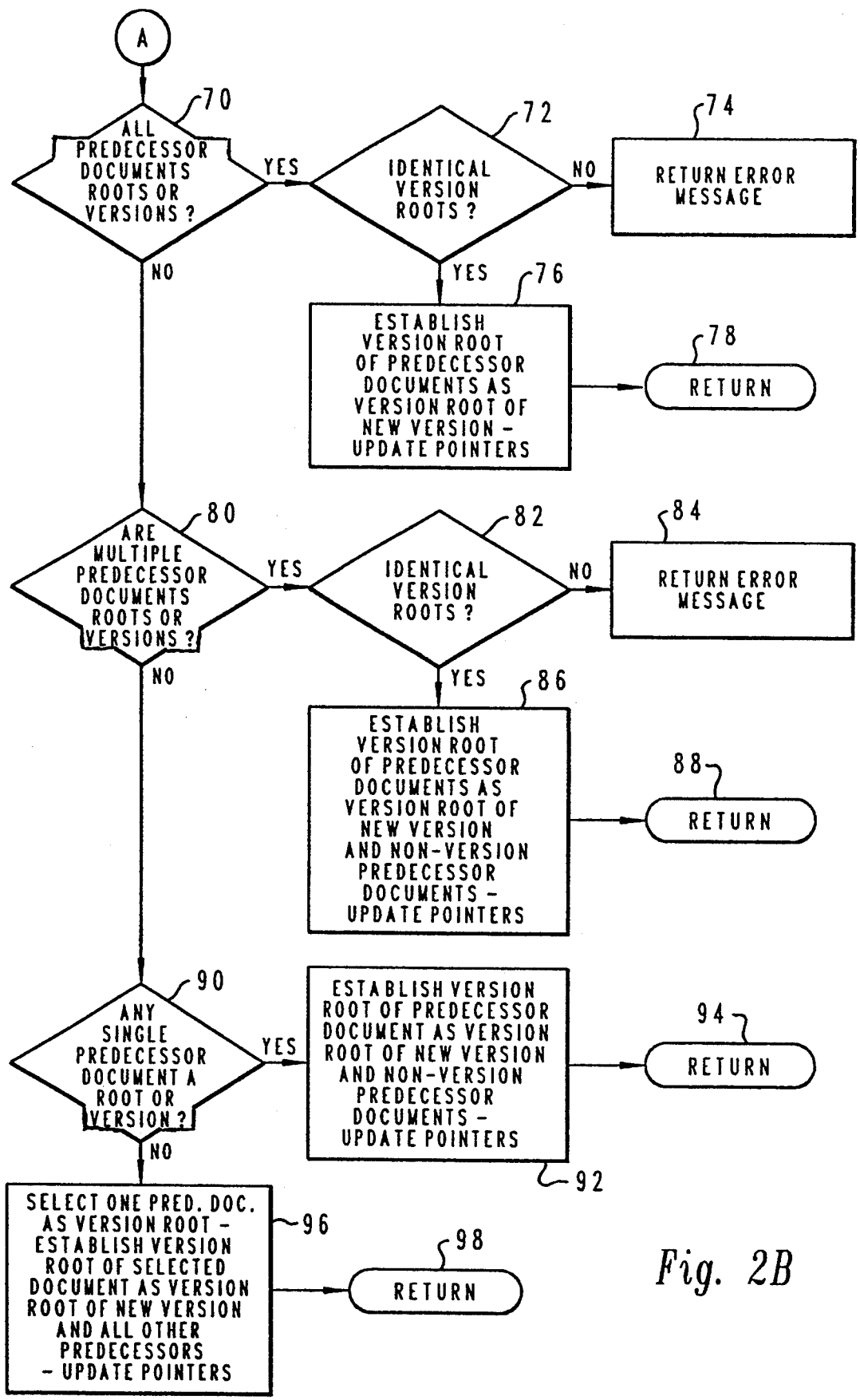

With reference now to the figures and in particular with reference to FIG. 1, there is depicted a pictorial representation of a distributed data processing system 8 which may be utilized to implement the method and system of the present invention. As may be seen, distributed data processing system 8 may include a plurality of networks, such as Local Area Networks (LAN) 10 and 32, each of which preferably includes a plurality of individual computers 12 and 30 respectively. Of course, those skilled in the art will appreciate that a plurality of Intelligent Work Stations (IWS) coupled to a host processor may be utilized to implement each such network.

As is common in such data processing systems, each individual computer may be coupled to a storage device 14 and/or a printer/output device 16. One or more such storage devices 14 may be utilized, in accordance with a method and system of the present invention, to store the various objects or documents which may be periodically accessed by a user having access to such objects or documents. Further, one or more such storage devices 14 may be utilized, as will be explained in greater detail herein, to store multiple predecessors and/or successors of a particular document within a data processing system implemented library, in accordance with a method and system of the present invention.

selects one of the predecessor documents as a root document and thereafter assigns a version-root identifier of that document to all predecessor documents selected by the user and to the current version of the document under creation. The pointers to these documents are then updated and the process then returns, as depicted at block 98.

Figure 3:
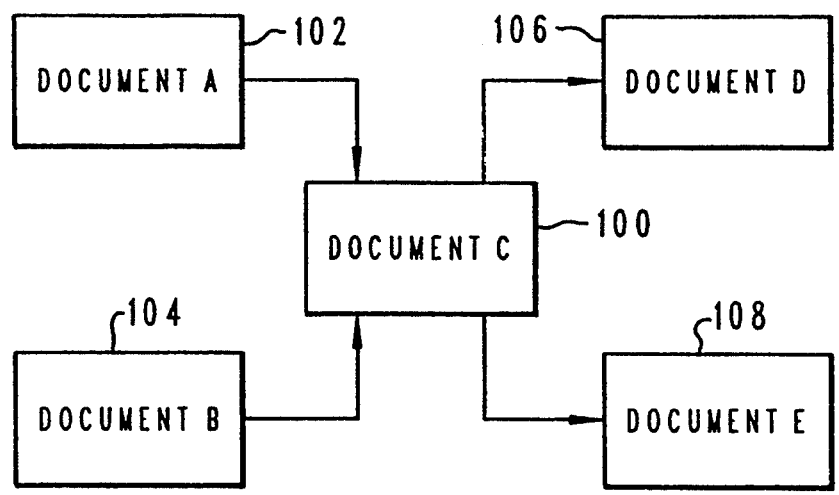
FIG. 3 is a pictorial representation of a first Conceptual Document structure which may be implemented utilizing the method and system of the present invention.

With reference now to FIG. 3, there is depicted a pictorial representation of a first Conceptual Document structure which may be implemented utilizing the method and system of the present invention. As illustrated, a document C, at reference numeral 100, is depicted having multiple predecessor documents 102 and 104 and multiple successor documents 106 and 108. As described above with respect to the logic flowchart all version-root identifiers for predecessor documents 102 and 104, where present, must be identical and will thereafter be utilized as the version-root identifier for all successor documents within the Conceptual Document. In the event neither predecessor document 102 or predecessor document 104 includes a version-root attribute, the office Library Server, in accordance with an important feature of the present invention, will select the Unique Permanent Identifier of either predecessor document 102 or 104 as the version-root of the Conceptual Document depicted within FIG. 3 and this version-root identifier will then be added to the attribute of each document within the Conceptual Document depicted within FIG. 3. Thus, documents 100, 106 and 108 will each thereafter include a version-root identifier selected by the Library Server from either predecessor document 102 or predecessor document 104.

Figure 4:
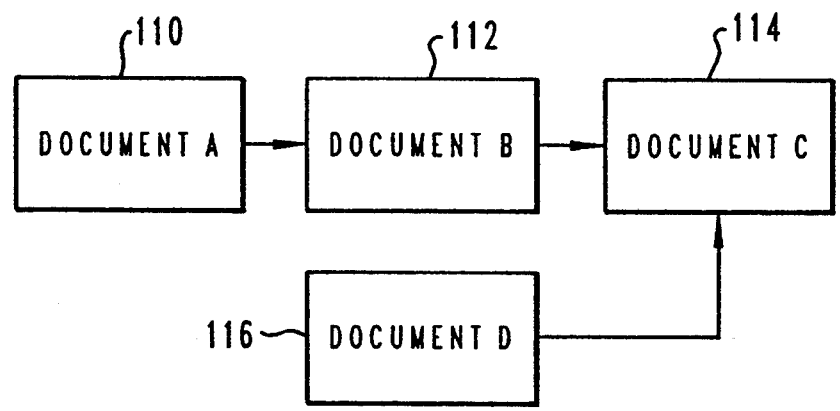
FIG. 4 is a pictorial representation of a second Conceptual Document structure which may be implemented utilizing the method and system of the present invention.

Referring now to FIG. 4 there is depicted a pictorial relationship of a second Conceptual Document structure which may be implemented utilizing the method and system of the present invention. As depicted in FIG. 4, document A, at reference numeral 110, is the predecessor document for document B, at reference numeral 112. Document B, at reference numeral 112, and document D, at reference numeral 116, are both predecessor documents of document C, at reference numeral 114. Thus, any document may be included in a Conceptual Document as a predecessor of another document which is being added to the Conceptual Document, if that document is not a member of a second Conceptual Document (there is no version-root identifier present which is not identical to the version-root of the documents within the present Conceptual Document). In accordance with an important feature of the present invention, predecessor document D, at reference numeral 116, will automatically be assigned the same version-root identifier of document A, at reference numeral 110, as that version-root identifier will be automatically associated with document C, at reference numeral 114.

Figure 5:
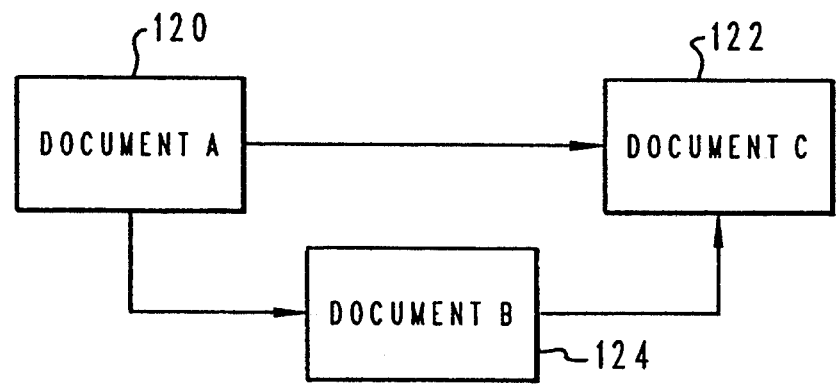
FIG. 5 is a pictorial representation of a third Conceptual Document structure which may be implemented utilizing the method and system of the present invention.

Finally, with reference to FIG. 5 there is depicted a pictorial representation of a third Conceptual Document structure which may be implemented utilizing the method and system of the present invention. As illustrated in FIG. 5, a predecessor document A, at reference numeral 120, is utilized to create a successor version document C, at reference numeral 122 and a successor version document B, at reference numeral 124. Document C also includes as a predecessor document B, at reference numeral 124. Thus, any document within the same Conceptual Document may have multiple predecessors, so long as those predecessors are not coincident. That is, document A, at reference numeral 120, and document B, at reference numeral 124, may be utilized as multiple predecessor documents for a third document since these predecessors share the same version-root identifier.

Additionally, the depicted embodiment of the present invention will automatically update all pointers within the library by automatically assigning a unique version-name to each newly created version document while also including in association with such version documents an identification of the immediate predecessor document(s). Further, when a document is utilized as a predecessor, an indication of the unique version name of its successor will be associated with the predecessor document. In this manner, a Library Service may easily keep track of all related documents within a single Conceptual Document.

Upon reference to the foregoing those skilled in the art will appreciate that the Applicants herein have created a method and system which may be utilized to create and maintain multiple document versions in a data processing system implemented library wherein each document therein may have multiple predecessors and multiple successors. This flexible model of versioning allows many different combinations of Conceptual Document structures, greatly enhancing the flexibility of a data processing system implemented library.

While the invention has been shown in only one of its forms, it is not thus limited but is susceptible to various changes and modifications without departing from the spirit thereof.

What is claimed is:

1. A method in a data processing system implemented library for maintaining multiple versions of a document within said library, wherein said document may include one or more successor versions and/or one or more predecessor documents which are related to said document, said method comprising the data processing system implemented steps of:

uniquely identifying an original document within said library as a root document;

establishing a version-root identifier to be associated with all successor versions of said original document which may thereafter be created within said library;

for each successor version of said original document, automatically associating said version-root identifier with each successor document of said original document which is therefore created within said library; and for each successor version of said original document and a second predecessor document, automatically associating said version-root identifier with said successor version and said second predecessor document wherein all documents related to said original document and created after said original document was identified as a root document within said library will have an identical version-root identifier associated therewith.

2. The method in a data processing system implemented library for creating and maintaining multiple versions of a document within said library according to claim 1, further including the step of associating an identification of an immediate predecessor document with each successor document within said library.

3. The method in a data processing system implemented library for creating and maintaining multiple versions of a document within said library according to claim 1, further including the step of associating a unique version-name with each successor version of said original document.

4. A method in a data processing system implemented library for maintaining multiple versions of a document within said library, wherein said document may include one or more successor versions and/or one or more predecessor documents which are related to said document, said method comprising the data processing system implemented steps of:

uniquely identifying a plurality of original documents within said library as root documents;

establishing a selected version-root identifier for all successor versions of each of said plurality of original documents which may thereafter be created within said library;

for each successor version which is thereafter created of a uniquely identified one of said plurality of original documents and a second predecessor document, automatically associating said selected version-root identifier with said successor version of said uniquely identified one of said plurality of original documents and said second predecessor document;

for each successor version of a first predecessor document and a second predecessor document, automatically identifying a selected one of said predecessor documents as a root document and establishing a particular version-root identifier for all successor versions thereof; and thereafter, automatically associating said particular version-root identifier with said successor version of said first predecessor document and said second predecessor document.

5. The method in a data processing system implemented library for creating and maintaining multiple versions of a document within said library according to claim 4, further including the step of associating an identification of an immediate predecessor document with each successor document within said library.

6. The method in a data processing system implemented library for creating and maintaining multiple versions of a document within said library according to claim 4, further including the step of associating a unique version-name with each successor version of said original document.

7. A data processing system for maintaining multiple versions of a document within a library within said data processing system, wherein said document may include one or more successor versions and/or one of more predecessor documents which are related to said document, said data processing system comprising:

means for uniquely identifying an original document within said library as a root document;

means for establishing a version-root identifier for all successor versions of said original document which may thereafter be created within said library;

means for automatically associating said version-root identifier with each successor version of said original document within said library; and means for automatically associating said version-root identifier with a successor version of said original document and a second predecessor document, and said second predecessor document, wherein all documents related to said original document and created after said original document was identified as a root document within said library will have an identical version-root identifier associated therewith.

8. The data processing system for creating and maintaining multiple versions of a document within a library within said data processing system according to claim 7, further including means for associating an identification of an immediate predecessor document with each successor version document within said library.

9. The data processing system for creating and maintaining multiple versions of a document within a library within said data processing system according to claim 7, further including means for associating a unique version-name with each successor version of said original document.

* * * * *